United States Patent [19]

Skiens et al.

[11] Patent Number: 4,896,314

[45] Date of Patent: Jan. 23, 1990

[54] BUMP-FORMING MEDIA INCLUDING THIN INTERMEDIATE REFLECTIVE LAYER AND METHODS FOR WRITING, READING, AND ERASING SAME

[75] Inventors: W. Eugene Skiens, Wilsonville; Michael A. Lind; John S. Hartman, both of Durham; John W. Swanson, Portland; Nancy E. Iwamoto, Portland, all of Oreg.

[73] Assignee: Optical Data, Inc., Beaverton, Oreg.

[21] Appl. No.: 183,719

[22] Filed: Apr. 19, 1988

[51] Int. Cl.$^4$ ................................................ G11B 7/24
[52] U.S. Cl. ................................ 369/284; 346/135.1; 369/100; 436/945
[58] Field of Search ............... 369/100, 275, 283, 284, 369/286, 288; 346/135.1; 430/19, 945

[56] References Cited

U.S. PATENT DOCUMENTS

| | | | |
|---|---|---|---|
| 4,300,227 | 11/1981 | Bell | 369/84 |
| 4,336,545 | 6/1982 | Howe et al. | 346/1.1 |
| 4,398,203 | 8/1983 | Cornet | 346/135.1 |
| 4,430,659 | 2/1984 | Maffitt et al. | 346/135.1 |
| 4,578,788 | 3/1986 | Ahn et al. | 369/275 |
| 4,584,259 | 4/1986 | Mayer et al. | 430/273 |
| 4,651,172 | 3/1987 | Watanabe | 369/100 |
| 4,719,615 | 1/1988 | Feyrer et al. | 369/284 |

*Primary Examiner*—Steven L. Stephan
*Attorney, Agent, or Firm*—Chernoff, Vilhauer, McClung & Stenzel

[57] ABSTRACT

An optical data storage medium includes a triple layer recording structure having an expansion layer, a retention layer and a very thin reflective layer interposed between the retention and expansion layers. The three layers are strongly bonded together so that the thermally and mechanically active expansion and retention layers can mechanically act upon each other through the intermediate reflective layer. The expansion and retention layers are dyed to selectively pass or absorb light of preselected wavelengths. The thin reflective layer is adapted to partially pass and partially reflect light of preselected wavelengths.

22 Claims, 1 Drawing Sheet

BUMP-FORMING MEDIA INCLUDING THIN INTERMEDIATE REFLECTIVE LAYER AND METHODS FOR WRITING, READING, AND ERASING SAME

FIELD OF THE INVENTION

This invention relates to optical data storage media, and particularly to media having a triple layer recording structure including a thin intermediate reflective layer, and to methods for writing, reading, and erasing such media.

BACKGROUND OF THE INVENTION

U.S. Pat. No. 4,719,615, owned by applicants' assignee, discloses an erasable bump-forming medium having a dual layer recording structure of two thermally and mechanically active layers which are bonded together and cooperate to write, retain, and erase data in the medium. The layers are optically coupled, having substantially similar indices of refraction. The medium is adapted to be inscribed and erased by lasers in a non-vesicular, non-ablative technique. The medium as disclosed forms an air-incident bump toward the laser source.

A number of other patents including Cornet U.S. Pat. No. 4,398,203, Mayer et al. U.S. Pat. No. 4,584,259, Maffit U.S. Pat. No. 4,430,659, Bell U.S. Pat. No. 4,300,227, and Howe et al. U.S. Pat. No. 4,336,545 disclose optical data storage media which use a relatively thick, highly reflective layer beneath the data layer(s).

Ahn et al. U.S. Pat. No. 4,578,788 discloses a non-erasable medium including an embedded servo track with a thin film having a high optical index of refraction on the servo track. The thin, high-index film is partially reflective. Data is recorded in the medium with a non-erasable, vesicular technique by heating a metal data layer until an adjacent organic layer gasifies and causes the data layer to form a vesicle.

SUMMARY OF THE INVENTION

Recording media according to the present invention feature a triple layer recording structure including an expansion layer, retention layer, and a thin intermediate reflective layer which cooperate to form an optically detectable deformation therein by thermal expansion of the expansion layer when the expansion layer is heated by light radiation of a preselected wavelength. The three layers are strongly bonded together with the reflective layer in the middle so as to enable the retention layer, through the reflective layer, to hold the expansion layer in a stretched expanded condition.

Various embodiments according to the present invention include: media having the triple layer recording structure oriented so that the retention layer is closest to the light source; media having the triple recording structure oriented so that the expansion layer is closest to the light source; media including layers in addition to the triple layer recording structure; and media including additional thin reflective layers.

The reflective layer in these media may be a thin metal layer which is partially transparent or a thin layer of material with a high index of refraction, the material including a colorant such as an organic dye. In either case the reflective layer has an index of refraction which is substantially different from the refractive indices of the adjacent retention and expansion layers. Methods for writing, reading, and erasing data in these media use one or more dyes and lasers of one or more wavelengths to selectively absorb, transmit, and/or reflect light in the various layers or at the interfaces therebetween.

Accordingly, it is a principal object of the invention to provide optical data storage media having a triple layer recording structure with an intermediate reflective layer.

It is a further object to provide a triple layer recording structure having a thin reflective layer between two thermally and/or mechanically active layers.

It is a further object to provide such a media wherein the three layers are strongly bonded together enabling the outer layers to mechanically act upon each other through the intermediate reflective layer.

It is a further object to provide such media wherein the intermediate reflective layer has a refractive index which is substantially different from the indices of the adjacent layers.

It is a further object to provide such media wherein the intermediate reflective layer is relatively thin.

It is an associated object to provide such media wherein the reflective layer is partially reflective and partially transmissive.

It is a related object to provide such a media having reflective layers which are either thin metal films which are not opaque, or thin colorant layers which may be selected to partially reflect and/or partially transmit light of preselected wavelengths.

It is another object of the present invention to provide such media wherein the absorptance of the reflective layer is minimized at preselected wavelengths.

It is a further object to provide such media which may be adapted to permit selective erasure of data within the media.

It is a further object to provide such media which are adapted to bulk erasure.

It is a further object to provide such media which employ one or more dyes.

It is a further object to provide such media where data marks are generated and read by a focused laser beam from the air interface side of the media structure.

It is a further object to provide such media where data marks are generated and read by a focused laser beam from the transparent substrate side of the media structure.

It is another object to provide such media which employ a second reflective layer.

It is a further object to provide such media which include a compression layer between the substrate and retention layer.

Further objects of the present invention are to provide methods for writing, reading and erasing such media and to provide such methods which employ one or more lasers of preselected wavelengths which are selectively absorbed in, transmitted through, or reflected from the various layers and the interfaces therebetween.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
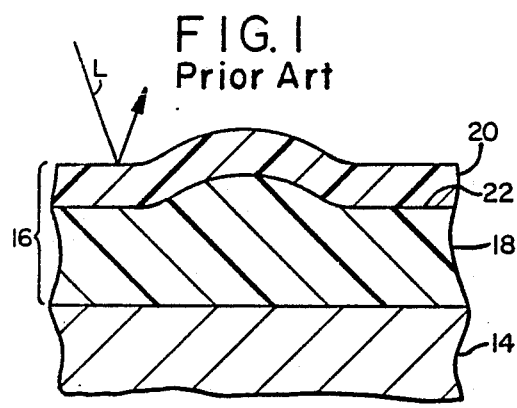
FIG. 1 shows an erasable dual layer recording medium disclosed in a published European patent application owned by applicant's assignee.

Referring to FIG. 1, applicant's own prior art bump-forming medium as disclosed in U.S. Pat. No. 4,719,615 includes a substrate 14 and a dual recording layer 16 deposited on the substrate, the dual layer susceptible to expansion and relaxation, to writing data thermally (expansion), to erasing data thermally and mechanically (relaxation), and to reading data optically. The dual layer 16 includes a bottom layer 18 and a top layer 20 which are bonded together at their interface 22.

The layers 18 and 20 of the dual recording layer are preferably light-transparent amorphous polymers which have been dyed to selectively absorb or transmit light of preselected wavelengths. Layer 18 is substantially rubbery at ambient temperature while layer 20 is glassy, having a glass transition temperature ("$T_g$") above that of layer 18 and generally above ambient temperature.

Data is recorded or written in the dual layer medium by using a focused laser beam of a first preselected wavelength, the "write beam," which is substantially transmitted by layer 20 and substantially absorbed by layer 18, heating and thermally expanding the material of layer 18. At the same time, layer 20 may also be heated above its $T_g$ to a rubbery state by (a) partial absorption of the light of the write beam; or (b) absorption of light of a second preselected wavelength, the "erase beam"; and/or (c) heat conducted from the adjacent heated layer 18. The now-rubbery layer 20 permits thermal expansion of layer 18 to form a bump or deformation on the surface of layer 20. When the laser(s) are turned off and the material cools, layer 20 rapidly falls below its $T_g$, becoming glassy and rigid and, through the bond between the two layers, holding layer 18 in stretched expanded condition, retaining the deformation as shown in FIG. 1.

To erase the deformation, the dual layer medium of FIG. 1 is exposed to a laser beam of a second preselected wavelength, the erase beam, which is substantially absorbed by layer 20, heating layer 20 above its $T_g$, and making it rubbery and pliable while not substantially heating layer 18. Layer 18 then mechanically pulls layer 20 flat, relaxing and erasing the deformation.

Layers 18 and 20 of the dual layer medium are optically coupled, having about the same index of refraction, so that substantially all the light which is propagated through layer 20 is absorbed in layer 18 enabling lower power light sources to be used.

Since the prior art medium of FIG. 1 is air-incident, data is read by a laser beam L, either the write beam or the erase beam, at a lower power setting than would be used to write or erase. Because the index of refraction of air is substantially different from the index of layer 20, part of the light energy will be reflected at the interface between the air and layer 20.

To the extent permitted by MPEP 608.01(p), the media and methods described in applicant's commonly owned and recently issued U.S. Pat. No. 4,719,615 are incorporated by reference.

Figure 2:
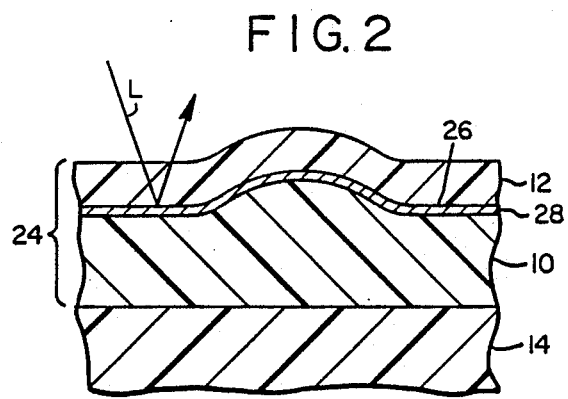
FIG. 2 shows an exemplary air-incident triple layer recording structure according to the present invention.

FIGS. 2–4 show exemplary media according to the present invention. Each of these exemplary mediums include layers which correspond generally, in function and characteristics, to the layers 18 and 20 described above. However, since these layers are not in the same positional and structural relationship to each other as described above (i.e. top and bottom, bonded together), they will be referred to herein as the expansion layer 10 and the retention layer 12, the expansion layer 10 corresponding generally to layer 18 and the retention layer 12 corresponding generally to layer 20. Of course this terminology also relates to the function of the layers in the media, the expansion layer thermally expanding to provide the impetus for the optically detectable deformation, and the retention layer serving to hold or retain the expansion layer in stretched, expanded configuration.

The embodiments of the present invention shown in FIGS. 2–4 include a triple layer recording structure 24 having a thin intermediate reflective layer 28 interposed between and strongly bonded to both the expansion layer 10 and retention layer 12 to enable those outer layers to mechanically act upon each other through the intermediate reflective layer. Specifically, the bond between the reflective layer 12 and the adjacent expansion and retention layers should be sufficiently strong to enable the retention layer, in its glassy state, through the reflective layer bonded thereto, to hold or retain the expansion layer in stretched, expanded configuration, even after the total structure has cooled.

While the reflective layer is thin and sufficiently pliable or ductile so as to not interfere with the ability of the triple layer structure to expand and relax according to the principles set forth above, it must also have sufficient structural integrity to hold the triple layer recording structure together during a write and erase cycle.

In contrast to the prior art dual layer medium 16 described above with respect to FIG. 1, the triple recording layer structure of FIGS. 2–4 is specifically constructed so that the index of refraction of the reflective layer is substantially different from the index of refraction of one or both of the expansion or retention layers so as to create a reflective interface 26 between the reflective layer and at least one of the adjacent retention or expansion layers. Preferably, the difference between the refractive index of the reflective layer and the indices of the expansion and retention layers is substantial. In the exemplary media disclosed herein the indices of the retention and expansion layers will be relatively low, approximately 1.5–1.7 and the index of the reflective layer will be relatively high, greater than 2.0.

Additionally, as will be explained below, the reflective layer needs to partially transmit light of at least some wavelengths as well as partially reflect light. The material of the reflective layer should be chosen, and the layer should be constructed, so that absorbtance of the reflective layer is minimized, particularly for the operative wavelengths. With a dye reflective layer this can be accomplished by selecting a dye which does not absorb at the operative wavelengths. With a metal reflective layer, a metal, such as aluminum is chosen, which does not absorb appreciably in the infrared spectrum of the operative lasers. Care is taken in the construction of the layers so as to not include impurities which would increase the absorbtance. Further characteristics of the triple layer recording structure and the reflective layer will be explained with respect to the specific embodiments shown in the drawings and to the method for writing, reading and erasing the same.

Referring specifically to FIG. 2, an air incident medium is shown including a triple layer recording structure 24 mounted on a substrate 14 having the retention layer 12 adjacent the air and proximate the laser source and the expansion layer 10 adjacent the substrate. In FIG. 2, the reflective layer 28 comprises a thin metal layer.

In the medium shown in FIG. 2, an amorphous polymer expansion layer 10 is dyed so as to substantially absorb light in a range of wavelengths which includes a first preselected wavelength hereinafter referred to as the "write beam." An amorphous polymer retention layer 12 is dyed, preferably with a narrow band dye, so as to substantially absorb light in a range of wavelengths which include a second preselected wavelength, hereinafter referred to as the "erase beam," and also so as to substantially transmit the write beam.

The metal reflective layer may be of such metals as aluminum, platinum, or silver, and is relatively thin, preferably in the range of 20 to 50 nanometers ("nm"). A metal layer this thin may not be opaque, but can partially transmit light, as determined by the electronic structure of the layer and according to how much other material, such as oxygen, becomes entrained in the metal layer during deposition.

Data is written in the medium of FIG. 2 by using a write beam of relatively high power to enable a portion of the write beam to penetrate the thin metal reflective layer 28 and be absorbed by the dyed material of the expansion layer 10, causing the material of the expansion layer to be heated and expand. The metal layer may transmit between 10% and 80% of the write beam to the expansion layer depending upon the thickness of the metal layer and the impurities therein. The material of the retention layer immediately above the heated expansion layer may be heated above its $T_g$ by any of the methods described above with respect to the prior art medium of FIG. 1, permitting the swelling expansion layer to push the now rubbery retention layer into a surface bump.

Alternatively, the retention layer may not be heated above its $T_g$, but is stretched, initially elastically, and then viscoelastically, causing "shear" deformation of the retention layer. To the extent permitted by MPEP 608.01(p), applicants' assignee's co-pending application Ser. No. 914,461 is incorporated by reference.

When the laser beam(s) are turned off, the medium cools, the retention layer cooling below its $T_g$ and hardening while the expansion layer is still in a stretched, expanded condition. Due to the strong bonds between the layers of the triple layer recording structure, the retention layer, through the reflective layer, is able to hold the expansion layer in a stretched, expanded condition. Of course, it is necessary that the retention layer, in its glassy state, be sufficiently strong and rigid to hold the rubbery expansion layer in a stretched condition. In the shear method described above, the expansion layer cools and attempts to contract. Because the layers are strongly bonded together, the contracting expansion layer is able to remove the elastic deformation of the retention layer, but the viscoelastic portion of the deformation is retained, holding the expansion layer in a partially stretched, expanded condition.

To read data written in the medium of FIG. 2, the write laser, at substantially lower power than is used to write, is used to read. At low power, the write/read beam does not heat the expansion layer significantly. Because the index of refraction of the metal reflective layer is substantially different than the overlying retention layer, the write beam is partially reflected at the interface 26 between the retention layer and the metal reflective layer. The metal reflective layer may reflect between 10% and 80% of the write beam. The reflected light beam is detected in such a way as to read the bump caused by the deformation.

In order to erase the deformation in the medium, an erase beam is directed at the deformation and substantially absorbed by the dyed polymer material of the retention layer without substantially heating the underlying expansion layer. The erase beam locally heats the retention layer, raising the retention layer above its $T_g$ and allowing the elastically stretched expansion layer to pull the retention layer flat, relaxing and thus erasing the deformation.

Alternative embodiments of media according to the present invention might include a retention layer which is not dyed. Such media might be of the WORM type (Write Once, Read Many) or may be susceptible to bulk erasure by heating the entire medium until the retention layer is raised above its $T_g$. Of course, media having dyed retention layers are also susceptible to bulk erasure.

From the foregoing description of a write/read/erase cycle, it will be apparent that the layers of the triple layer recording structure must be bonded together strongly. Particularly, the bonding must be sufficient so the retention layer, through the reflective layer, can hold the expansion layer in stretched, expanded configuration after the write laser pulse and sufficient so that the stretched expansion layer, through the reflective layer, can pull the retention layer flat following the erase laser pulse.

Great care is required in construction of the medium of FIG. 2 to achieve adhesive bonds between the metal reflective layer and the adjacent polymer layers. Indeed, applicant had previously thought that polymers could not be bonded to metals with a bond sufficient to perform the method described above. However, applicant has discovered that by carefully treating the surfaces of the respective layers, an adhesive bond of sufficient strength is obtainable.

An alternative embodiment of the medium shown in FIG. 2 could be constructed using a thin dye reflective layer 28. An organic dye could be carried by a polymer material, or could be applied to the underlying expansion layer in a nonagressive solvent which does not dissolve, disrupt or disturb the underlying layer so as to create a thin distinct dye layer with defined interfaces between it and the adjacent polymer layers.

Figure 3A:
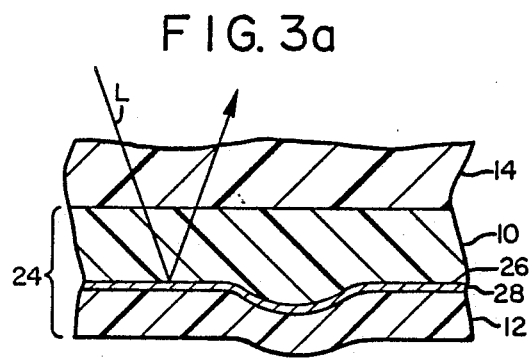
FIG. 3a shows an exemplary substrate incident triple layer recording structure according to the present invention having a thin metal reflective layer and showing the bump extending away from the laser source.
Figure 3B:
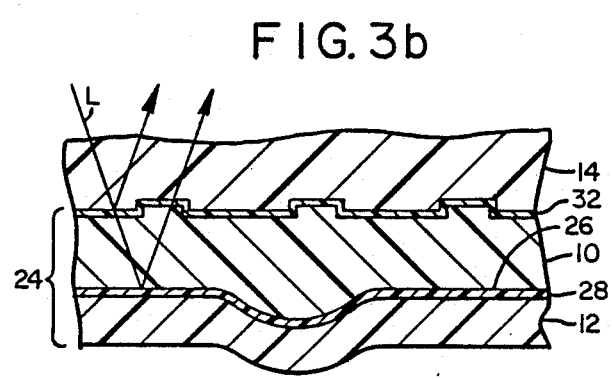
FIG. 3b shows the exemplary medium of FIG. 3a having a thin dye reflective layer, grooves formed in the substrate, and a second thin dye reflective layer formed at the interface of the grooved substrate and the expansion layer.

A different configuration of a triple layer recording structure is shown in FIGS. 3a and 3b. These structures may be called substrate incident, rather than air incident, since the operative laser beams must pass through the supporting substrate 14 in order to reach the operative layers. While the substrate in FIGS. 1 and 2 could be either metal, plastic or other rigid supporting material, the substrate of FIGS. 3 and 4 should be substantially transparent to the operative laser beams. Materials which would be appropriate for such a substrate include polycarbonate, epoxy, polymethylmethacrylate (PMMA), and glass. The other materials of the medium should be bonded to the substrate in such a manner that the medium does not creep or delaminate from the substrate.

In FIGS. 3a and 3b, the expansion layer 10 is again adjacent the substrate 14 and the retention layer 12 is remote from the substrate, with the reflective layer 28 interposed between and bonded to the expansion and retention layers. The retention layer may be exposed to the air or may be covered by further layers, such as protective layers, not relevant to the present invention.

The triple layer recording structures of FIGS. 3a and 3b are bonded together and function essentially as explained above with the differences noted below. FIG. 3a shows a metal reflective layer 28. Since the expansion layer is proximate the laser source in this configuration, it is dyed with a narrow band dye which is selected to substantially absorb the write beam, and substantially transmit the erase beam, while the retention layer is dyed to absorb the erase beam and not the write beam. The erase beam is used at relatively high power to penetrate the thin metal reflective layer, and at a much lower power to read data which has been written in the medium.

In a medium such as shown in FIG. 3a it may be preferable to have the ungrooved substrate optically coupled to the adjacent expansion layer, with the refractive index of the substrate substantially similar to the refractive index of the adjacent expansion layer so as to discourage reflection at their interface.

Figure 4A:
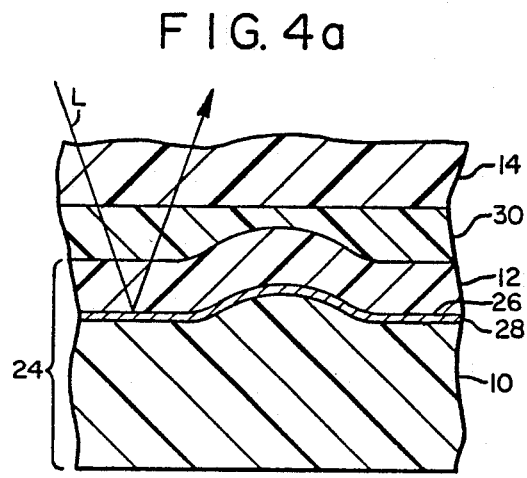
FIG. 4a shows an exemplary substrate incident triple layer recording structure having a compression layer between the bump and the substrate and employing a thin metal reflective layer.
Figure 4B:
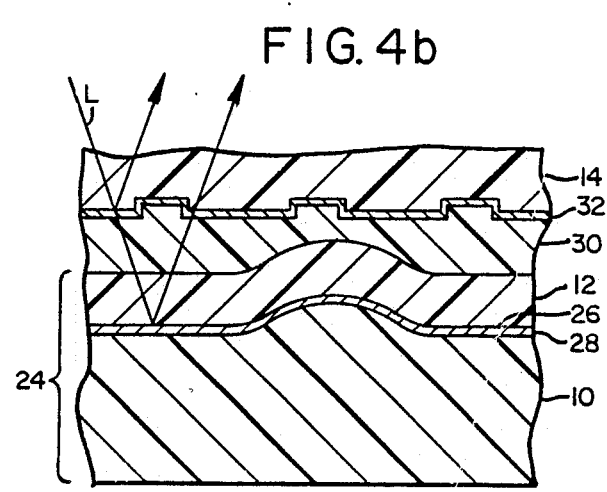
FIG. 4b shows the exemplary medium of FIG. 4a including a grooved substrate and second thin metal reflective layer between the compression layer and the grooved substrate.

It should be noted that the expansion layer 10 of FIGS. 3a and 3b may be thinner than the expansion layer in FIGS. 1, 2, and 4a and 4b. This is because the bump is being formed on the side of the expansion layer opposite the laser source. In a dyed organic layer such as described herein, the energy of the laser beam is substantially absorbed in the portion of the layer proximate the source. The depth at which 63% of the energy of the beam is absorbed is called the "skin depth." The thickness of the expansion layer in FIGS. 1 and 2 should be approximately equal to or greater than one skin depth, to ensure maximum sensitivity. In FIGS. 4a and 4b, the thickness of the expansion layer should be considerably greater than one skin depth to ensure maximum sensitivity. However, in FIGS. 3a and 3b, the thickness of the expansion layer should not be substantially greater than one skin depth to encourage that the bump expands away from the incident laser beam.

Referring to FIG. 3b, an additional thin substrate reflective layer 32 is interposed between and bonded to the expansion layer and a grooved substrate. The medium of FIG. 3b employs dyed reflective layers 28 and 32. In this exemplary medium three dyes could be used. The dye of the expansion layer 10 should be narrow band to absorb the write beam and pass the erase beam. The dye of both reflective layers should be adapted to partially reflect and partially pass the erase/read beam, the dye of the substrate reflective layer 32 should be adapted to at least partially pass the write beam, and the dye of the retention layer should be adapted to absorb the erase beam. It is important that the index of refraction of the respective reflective layers differ substantially from the index of refraction of the overlying substrate and expansion layer in order to enhance the reflectivity of the respective interfaces during the reading phase. Of course, the read/erase beam would be used at a relatively low power to read, and a relatively higher power to erase.

The mediums of FIGS. 4a and 4b include the triple layer recording structure 24 and a compression layer 30 of soft elastic material such as a silicone rubber or a fluoro-elastomer interposed between and bonded to the retention layer 12 and the substrate 14 as shown in FIG. 4a or between the retention layer 12 and the substrate reflective layer 32 as shown in FIG. 4b. Both compression layer and substrate should be substantially transparent to the operative laser beams. In a medium such as shown in FIG. 4a having an ungrooved substrate, the compression layer should also be optically coupled to the adjacent substrate and retention layers, having a refractive index substantially similar to those adjacent materials. The triple layer recording structure of FIGS. 4a and 4b would function substantially as described above with respect to that of FIG. 2. The compression layer 30 is adapted to be easily compressed by the bump formed in the triple layer recording structure, and the elastic nature of the compression layer will assist the stretched expansion layer to relax the bump during the erase phase.

Referring to FIG. 4b, an additional substrate reflective layer 32 is interposed between and bonded to the compressive layer 30 and a grooved substrate 14. The medium of FIG. 4 employs essentially the same triple layer recording structure as described above with respect to FIG. 4a. As before, the thin substrate reflective layer 32 may be either a thin metal layer or a dye layer, but in either case it should have an index of refraction which is substantially different from the index of refraction of the adjacent layers so as to create a reflective interface. If the substrate reflective layer is a dye layer, it should be a narrow band dye that is adapted to partially reflect the read beam while at least partially passing the write and erase beams.

The mediums of FIGS. 3b and 4b are particularly adapted to be used in a medium wherein information in the form of grooves or tracks is contained at the interface between the substrate and the adjacent material. Such grooved substrates are often called "servo-tracks" and contain preformatted information. Adding a thin substrate reflective layer 32 at that interface enhances the readability of that information. Of course, these reflective layers are adapted to be read by the same laser source which is detecting the reflective layer 28 within the triple layer recording structure. With respect to the media shown in FIGS. 3b and 4b, applicants envision the possibility of employing one metal reflective layer and one dye reflective layer in the same medium.

It should be noted that the materials which make up the triple layer recording structure do not melt, gasify or undergo significant changes in their crystalline structure during the writing, reading, or erasing phases.

With respect to the embodiments employing thin metal reflecting layers, these should be distinguished theoretically and functionally from those optical data storage media which use metal or metal layers as thermally and mechanically active layers of the medium. For example, many optical mediums use metal layers to absorb heat, conduct heat to adjacent layers or to hold optical deformations. The thin metal layers of applicant's media are so thin as to partially transmit light. Similarly, they are too thin to be mechanically significant in causing, holding or erasing an optical deformation.

In summary, exemplary materials and characteristics of the mediums of FIGS. 2-4b are set forth below:

FIG. 2

FIG. 2

| | Material | Thickness | Index | Dye |
|---|---|---|---|---|
| Retention layer | epoxy | 300–800 nm | 1.64 | narrow band absorbing at ($L_2$) |
| Reflective layer | aluminum | 40–50 nm | 2.6 | N/A |
| Expansion layer | polyurethane | 1000–5000 nm | 1.5 | narrow band absorb at ($L_1$) |
| Substrate | polycarbonate | 1.2 mm | 1.58 | N/A, clear | write beam - ($L_1$) < 10 milliwatts ("mW")
erase beam - ($L_2$) < 10 mW
read beam - ($L_1$) approximately 1 mW An exemplary medium according to FIG. 2 having a colorant dye reflective layer would employ a thin organic infrared dye layer approximately 60 nm thick, having an index of refraction of 2.6 and adapted to reflect $L_1$.

FIG. 3a

FIG. 3a

| | Material | Thickness | Index | Dye |
|---|---|---|---|---|
| Substrate | polycarbonate | 1.2 mm | 1.58 | N/A, clear |
| Expansion layer | polyurethane | 500–1000 nm | 1.5 | narrow band absorb at ($L_1$) |
| Reflective layer | aluminum | 40–50 nm | 2.6 | N/A |
| Retention layer | epoxy | 400–600 nm | 1.64 | absorb at ($L_2$) | write beam - ($L_1$) at < 10 mW
erase beam - ($L_2$) at < 10 mW
read beam - ($L_2$) at ≈ 1 mW

FIG. 3b

FIG. 3b

| | Material | Thickness | Index | Dye |
|---|---|---|---|---|
| Grooved substrate | polycarbonate | 1.2 mm | 1.58 | N/A, clear |
| Substrate reflective layer | organic infrared dye | 30–80 nm | 2.6 | reflect at ($L_2$) |
| Expansion layer | polyurethane | 500–1000 nm | 1.5 | narrow band absorb at ($L_1$) |
| Reflective layer | organic infrared dye | 30–80 nm | 2.6 | reflect at ($L_2$) |
| Retention layer | epoxy | 400–600 nm | 1.64 | absorb at ($L_2$) | write beam - ($L_1$) at < 10 mW
erase beam - ($L_2$) at < 10 mW
read beam - ($L_2$) at ≈ 1 mW

FIG. 4a

FIG. 4a

| | Material | Thickness | Index | Dye |
|---|---|---|---|---|
| Substrate | polycarbonate | 1.2 mm | 1.58 | N/A, clear |
| Compression layer | silicone | 400–500 nm | 1.41 | N/A, clear |
| Retention layer | epoxy | 400–600 nm | 1.64 | narrow band absorb at ($L_2$) |
| Reflective layer | aluminum | 40–50 nm | 2.6 | N/A |
| Expansion layer | polyurethane | 2000–5000 nm | 1.5 | absorb at ($L_1$) | write beam - ($L_1$) at < 10 mW
erase beam - ($L_2$) at < 10 mW
read beam - ($L_1$) at ≈ 1 mW

FIG. 4b

FIG. 4b

| | Material | Thickness | Index | Dye |
|---|---|---|---|---|
| Grooved substrate | polycarbonate | 1.2 mm | 1.58 | N/A |
| Substrate reflective layer | organic infrared dye | 30–80 nm | 2.6 | reflect at ($L_1$) |
| Compression layer | silicone | 400–500 nm | 1.41 | N/A, clear |
| Retention layer | epoxy | 400–600 nm | 1.64 | narrow band absorb at ($L_2$) |
| Reflective layer | organic infrared dye | 30–80 nm | 2.6 | reflect at ($L_1$) |
| Expansion layer | polyurethane | 2000–5000 nm | 1.5 | absorb at ($L_1$) | write beam - ($L_1$) at < 10 mW
erase beam - ($L_2$) at < 10 mW
read beam - ($L_1$) at ≈ 1 mW The terms and expressions which have been employed in the foregoing specification are used therein as terms of description and not of limitation, and there is not intention, in the use of such terms and expressions, of excluding equivalents of the features shown and described or portions thereof, it being recognized that the scope of the invention is defined and limited only by the claims which follow.

What is claimed is:

1. An optical recording medium including a triple layer recording structure, comprising:
   (a) a first layer of a first material;
   (b) a second layer of a second material;
   (c) a third layer of a third material interposed between said first and second layers;
   (d) said first, second and third layers cooperating as a medium for forming therein an optically detectable deformation by thermal expansion of said first material deforming said second and third layers without liquefaction or gasification of said first, second, or third materials when said first material is locally heated with light radiation of a first preselected wavelength $L_1$;
   (e) said first, second, and third materials being sufficiently bonded together so as to enable said second layer, through said third layer bonded thereto, to hold said first material in expanded configuration upon cessation of said $L_1$ and cooling of said first material, retaining said optically detectable deformation, said second layer being sufficiently strong and rigid to hold said first material in expanded condition, said third layer including reflective means for enhancing the optical reflectance of said optically detectable deformation;

(f) said first, second and third layers further cooperating as an erasable optical recording medium for relaxing said optically detectable deformation without liquefaction or gasification of said first, second, or third materials when said second material is locally heated with light of a second preselected wavelength $L_2$, said third layer being sufficiently bonded to said first and second layers to enable said first layer, through said third layer bonded thereto, to pull said second layer flat; and (g) said second layer adapted to substantially transmit said $L_1$ and substantially absorb said $L_2$ and said third layer adapted to partially transmit and partially reflect $L_1$.

2. The medium of claim 1 wherein said first, second and third layers are each discrete layers with distinct interfaces therebetween.

3. The medium of claim 1 wherein said first and second materials include polymers.

4. The medium of claim 1 wherein said reflective means includes a dye.

5. The medium of claim 1 wherein said reflective means includes metallic material.

6. The medium of claim 1 wherein said third layer is relatively thin, less than 100 nanometers.

7. The medium of claim 1 wherein said third layer has a refractive index which is substantially different from the refractive index of one of said first or second materials.

8. An optical recording medium of the type adapted to record data from a focused light source comprising:

(a) a first layer of a first polymer material remote from said light source, said first polymer material having a first refractive index and including first dye means for absorbing light of a first preselected wavelength $L_1$;

(b) a second layer of a second polymer material proximate to said light source, said second polymer material having a second refractive index;

(c) a third layer of a third material interposed between and bonded to said first and second layers, said third layer having a third refractive index which is substantially different from the refractive indices of one of said first or second materials; and (d) said third layer comprising a thin metal layer which is not opaque.

9. The medium of claim 8 wherein said third refractive index is substantially different from both of said first and second refractive indices.

10. The medium of claim 8 wherein the difference between said third refractive index and one of said first or second refractive indices is greater than 0.8.

11. The medium of claim 8 wherein said third refractive index is substantially higher than both of said first or second refractive indices.

12. The medium of claim 8 wherein said second polymer material includes second dye means for absorbing light of a second preselected wavelength $L_2$.

13. The medium of claim 8 wherein said third layer comprises a thin metal film not thicker than 50 nanometers.

14. The medium of claim 8 wherein said first layer is adapted to absorb light of said first preselected wavelength $L_1$, said second layer is adapted to substantially transmit said $L_1$, and said third layer is adapted to partially reflect and partially transmit $L_1$.

15. The medium of claim 8, including substrate means adjacent said first layer for supporting said first, second and third layers.

16. The medium of claim 8, including:

(a) a substrate adapted to pass $L_1$ substantially unabsorbed arranged between said second layer and said light source; and (b) an elastic compression layer adapted to pass $L_1$ substantially unabsorbed interposed between and bonded to said substrate and second layer.

17. The medium of claim 8 wherein the refractive indices of said substrate and said compression layer are substantially similar to said second refractive index of said second layer.

18. The medium of claim 8, including a reflective layer interposed between said substrate and said compression layer, said reflective layer having a refractive index which is substantially different from the refractive index of one of said substrate or said compression layer.

19. The medium of claim 8 wherein said reflective layer and said third layer comprise thin metal films which are not opaque.

20. An optical recording medium of the type adapted to record data from a focused light source comprising:

(a) a first layer of a first polymer material proximate said source, said first polymer material having a first refractive index including first dye means for absorbing light of a first preselected wavelength $L_1$;

(b) a second layer of a second polymer material remote from said source, said second polymer material having a second refractive index;

(c) a third layer of a third material interposed between and bonded to said first and second layers, said third layer having a third refractive index substantially different from the refractive index of one of said second or first layers;

(d) said first layer having a thickness not substantially greater than one skin depth; and (e) said third layer comprising a thin metal film which is not opaque.

21. The medium of claim 20, including a substrate adapted to pass $L_1$ substantially unabsorbed arranged between said first layer and said light source, said substrate having a refractive index which is substantially similar to said first refractive index.

22. The medium of claim 20 wherein said third refractive index is substantially different from both of said first and second refractive indices.

* * * * *